HIRAM CULVER, OF DANSVILLE, NEW YORK.

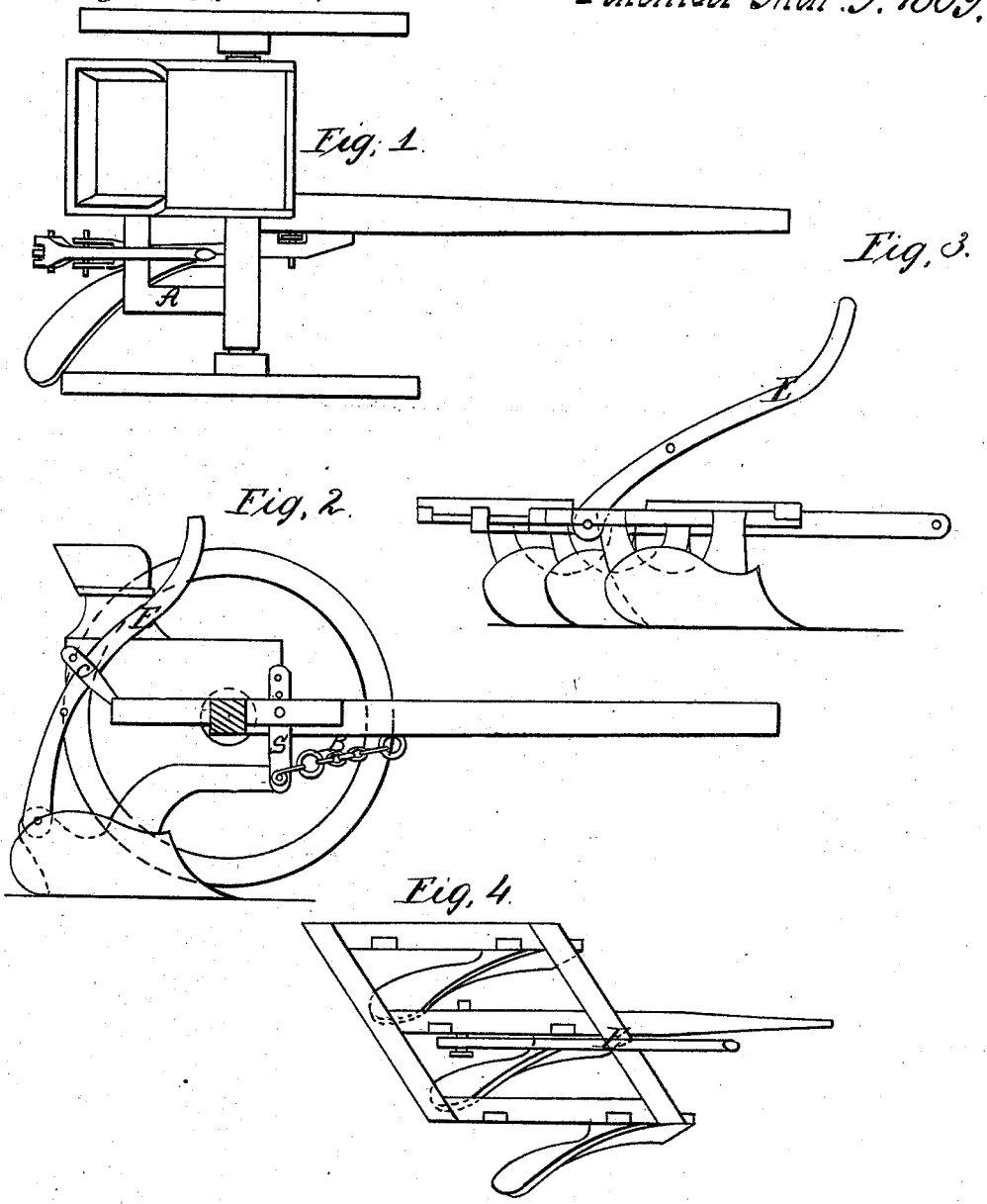

Letters Patent No. 87,641, dated March 9, 1869.

IMPROVEMENT IN PLOWS.

The Schedule referred to in these Letters Patent and making part of the same.

*To all whom it may concern:*

Be it known that I, HIRAM CULVER, of Dansville, in the county of Livingston, and State of New York, have invented a new and valuable Improvement in Plows; and I do hereby declare that the following is a full, clear, and exact description of the construction and operation of the same, reference being had to the annexed drawings, making a part of this specification, and to the letters and figures of reference marked thereon.

Figure 1 of the drawings is a plan view of my device;

Figure 2 is a sectional view thereof; and

Figures 3 and 4 are details.

My invention has relation to plows; and

It consists mainly in providing novel means by which the operator can adjust either a single or gang-plow to the beam, at will, and thereby adapt the machine to the requirements of the soil upon which he is engaged.

It also consists in providing efficient and novel means for raising or lowering the plows, for transportation or otherwise.

Fig. 1 of the drawings represents my plow-carriage. It is in the usual form, with two wheels, and has a driver's seat adjusted upon the carriage-axle, on one side of the tongue, as therein shown.

A frame, A, extends rearward from the axle, which serves not only as a support for the rear end of the carriage-seat, but also as a rest for the diagonal bar c, hereinafter mentioned.

The letter c is a slotted bar, adjusted to the rear bar of the frame A, in the manner shown on fig. 2, the office of which is to hold and aid in the operation of the plow-handle, as hereinafter described.

The letter B is a chain, attached, by its front end, to a staple in the lower side of the carriage-tongue, and at its rear end to a clevis connected by a pin with the pendant s. This pendant is adjusted in a mortise cut in the side of the wagon-tongue, or one of its hounds, in the manner shown, namely, by holes and pin, to the end that it may be raised or lowered at will.

The letter E represents the handle of my plow, hinged to the rear end of the landside thereof, and provided with pin-holes, (one or more,) adapted to the pin that passes through the slotted bar c, above mentioned. When a gang-plow is used, the handle E is hinged to the middle bar thereof, as shown on fig. 4 of the drawings.

To operate my device, the driver sits in his seat and manages the plow by means of the handle E resting in the slot of bar c, under the pin therein adjusted. To transport the plow, the operator raises said handle, and secures the same in said slot, by passing the pin through said handle, at such a point as will keep the plow from the ground.

The gang-plow is substituted for the single plow by placing its beam in the slot of pendant s, from which the beam of the single plow has been removed, and attaching the handle E to its middle beam, as represented on fig. 4.

These devices enable the operator to change or substitute a gang-plow for a single one, with great ease and rapidity, and thereby adapt his plowing to either a light or heavy soil.

What I claim as my invention, and desire to secure by Letters Patent, is—

The combination and arrangement of the bar c, pendant s, chain B, and handle E, with a single or gang-plow, as herein described, for the uses and purposes specified.

In testimony that I claim the above, I have hereunto subscribed my name, in the presence of two witnesses.

HIRAM CULVER.

Witnesses:
SETH N. HEDGES,
D. W. NOYES.